(12) United States Patent
Seigler et al.

(10) Patent No.: US 6,985,339 B2
(45) Date of Patent: Jan. 10, 2006

(54) DISC DRIVE HAVING ELECTROMAGNETIC BIASED SHIELDLESS CPP READER

(75) Inventors: Michael Allen Seigler, Pittsburgh, PA (US); Gregory John Parker, Warrendale, PA (US); Sharat Batra, Wexford, PA (US); Robert Earl Rottmayer, Wexford, PA (US); Jonathan David Hannay, Pittsburgh, PA (US); Petrus Antonius Van der Heijden, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 164 days.

(21) Appl. No.: 10/463,898

(22) Filed: Jun. 18, 2003

(65) Prior Publication Data

US 2004/0071017 A1 Apr. 15, 2004

Related U.S. Application Data

(60) Provisional application No. 60/390,168, filed on Jun. 20, 2002.

(51) Int. Cl.
G11B 5/39 (2006.01)

(52) U.S. Cl. .............................. 360/324.12; 360/324.2; 360/236.3

(58) Field of Classification Search ............. 360/324.1, 360/324.11, 324.12, 324.2, 236.3
See application file for complete search history.

(56) References Cited

U.S. PATENT DOCUMENTS

| 6,157,525 | A | 12/2000 | Iwasaki et al. ........ 360/324.12 |
| 6,333,842 | B1 * | 12/2001 | Nobuyuki et al. ........ 360/324.2 |
| 6,369,993 | B1 | 4/2002 | Hayashi .................... 360/327.2 |
| 6,529,353 | B2 * | 3/2003 | Shimazawa .............. 360/324.2 |
| 6,671,141 | B2 * | 12/2003 | Shimazawa et al. ..... 360/324.2 |
| 6,747,853 | B2 * | 6/2004 | Hayashi et al. ........ 360/324.12 |
| 6,785,092 | B2 * | 8/2004 | Covington et al. ......... 360/126 |
| 6,795,280 | B1 * | 9/2004 | Song et al. .............. 360/324.2 |
| 6,801,410 | B2 * | 10/2004 | Xue et al. ................... 360/321 |
| 6,847,509 | B2 * | 1/2005 | Yoshikawa et al. .... 360/324.12 |
| 2001/0040777 | A1 * | 11/2001 | Watanabe et al. ........... 360/321 |
| 2004/0042126 | A1 * | 3/2004 | Watanabe et al. ........... 360/319 |

OTHER PUBLICATIONS

Tsang, C., "Unshielded MR Elements With Patterned Exchange-Biasing", IEEE Transaction Of Magnetics, vol. 25, No. 5, Sep. 1989.

Takano et al., Ken-ichi, "Resolution of Unshielded and Shielded MR Heads For Perpendicular Magnetic Recording", Journal of Magnetism and Magnetic Materials, 1997.

* cited by examiner

Primary Examiner—Jefferson Evans
(74) Attorney, Agent, or Firm—Westman, Champlin & Kelly, P.A.

(57) ABSTRACT

A head slider moveable relative to a storage media having a storage layer is disclosed. The disc head slider comprises a read head formed on the head slider, and comprises a first electrical contact layer adapted to carry a sensor current, a second electrical contact layer adapted to carry the sensor current, a read sensor and a bias magnet. The read sensor is configured to carry the sense current perpendicular to plane. The read sensor also has a top sensor edge, and has a bottom sensor edge aligned with the air-bearing surface to access data in the storage disc. The bias magnet magnetically biases the read sensor. Further, the first and second electrical contact layers are made of a material that does not magnetically shield the read sensor.

20 Claims, 14 Drawing Sheets

DISC DRIVE HAVING ELECTROMAGNETIC BIASED SHIELDLESS CPP READER

CROSS-REFERENCE TO RELATED APPLICATION

The present application is based on and claims the benefit of U.S. Provisional Application No. 60/390,168 filed on Jun. 20, 2002 for inventors Michael A. Seigler, Gregory J. Parker, Sharat Batra, Robert E. Rottmayer, Jonathan D. Hannay and Petrus A. Van der Heijden and entitled ELECTROMAGNETIC BIASED SHIELDLESS CPP READER.

FIELD OF THE INVENTION

The present invention relates generally to read sensors in disc drives, and more particularly but not by limitation to magnetoresistive current-perpendicular-to-plane (CPP) read sensors in disc drives.

BACKGROUND OF THE INVENTION

A conventional current-in-plane (CIP) read/write head in a disc drive typically includes a magnetoresistive (MR) read sensor deposited between insulating layers and outer magnetic shield layers. A conventional current-perpendicular-to-plane (CPP) read/write head in a disc drive typically includes a magnetoresistive (MR) read sensor deposited between magnetic shield layers. In the CPP read/write head the sensor is in direct contact with the shields, which are also used as the electrical contacts. The magnetoresistive read sensor typically includes a magnetoresistor stack, the electrical contacts and one or more biasing magnets that magnetically bias the magnetoresistor stack.

The magnetoresistor and the electrical contacts carry electrical sense current. As magnetically stored data on a disc passes by the magnetoresistor, the magnetoresistor generates readback pulses that have readback amplitudes that represent the data stored on the disc. The readback amplitude is generally proportional to the sense current. The sense current amplitude and read sensor dimensions are chosen in a way that considers the needs of the read channel electronics. The sense current amplitude and read sensor dimensions are also chosen in a way that considers the need to limit heating to prevent damage to the magnetoresistor. The need for a high amplitude readback pulse and the need to limit heating conflict with one another and limit the performance that can be achieved with conventional magnetoresistive read sensors.

In a conventional magnetoresistive read sensor, electrical sense current flows in a major plane that is parallel to the plane of the thin-films in the magnetoresistive sensor and parallel to the air-bearing surface of the magnetoresistor stack. These conventional read sensors are known as Current In-Plane (CIP) sensors. In response to the need for smaller and more sensitive read heads, some magnetoresistive read sensors have been developed where the electrical sense current flows perpendicular to the major plane of the magnetoresistor stack. These read sensors are known as Current Perpendicular-to-Plane (CPP) sensors. Depending on the dimensions, CPP sensors may have several advantages over the CIP sensors. CPP-SV (spin valves) and CPP-ML (multi layer) sensors have been shown to have some key advantages over CIP spin-valves. CPP devices have been shown to have a GMR effect at least as large as CIP devices, as current passes through every ferromagnetic/non-magnetic (FM/NM) interface without current shunting. In addition, for a CPP device, the sensor and shields are in direct contact with each other; thus, no insulating layer is needed between them. This decreases the shield-to-shield spacing and allows for the shields to also act as good thermal heat sinks. Having a good thermal heat sink allows for larger sense currents to be used, which translates to a larger readback pulse amplitude (Vpp).

However, the change from CIP sensors to CPP sensors has resulted in a new set of problems for head designers. For example, lead materials in CPP sensors generally have been limited to good magnetic shielding materials such as Ni80Fe20, which have relatively high electrical resistivity, therefore there is a need to reduce the electrical resistivity of the lead materials.

As the read sensor and lead materials are in contact with each other in a CPP sensor the lead materials act poorly as large thermally conductive heat sinks. Unfortunately, as the lead materials have been limited to good magnetic shielding materials, which have a relatively low thermal conductivity, there is a need for lead materials that have a higher thermal conductivity to prevent over heating.

High density magnetic recording readback sensors such as CIP and CPP spin valves, magnetic tunnel junctions and CPP multi-layers need to be biased/stabilized using a magnet. Most sensors have the high permeability shields in close proximity to the sensor and biasing magnet. This proximity results in a large amount of the flux from the magnet being lost to the shields instead of biasing/stabilizing the sensor. The use of magnetic shielding materials for the leads, such as Ni80Fe20, results in several negative features. For example, Ni80Fe20 has a fairly large anisotropic magnetic resistive (AMR) effect. This AMR effect can be seen as noise in a read back voltage. Ni80Fe20 also has a high electrical resistivity of approximately 20 $\mu\Omega$-cm . The leads in a typical CPP head are in contact with the read sensor and act as large heat sinks. This is because Ni80Fe 20 has a relatively low thermal conductivity, that limits the maximum useable sense current for a spin valve. Therefore, it is desirable to reduce these effect to increase the efficiency of the sensor.

Perpendicular recording is a possible candidate for achieving high areal densities. One negative effect that has been identified in perpendicular recording is the Neighborhood Induced Transition Shift (NITS) effect. This effect comes from flux from adjacent tracks in the media entering the shields, traveling through the shields to the sensor and then down through the sensor into a soft underlayer on the disc and back to the original bit in the adjacent track. This creates a shift in the transfer curve that decreases the readback sensor dynamic range. Therefore there is a desire to limit the effects of NITS on the media in perpendicular recording.

Embodiments of the present invention provide solutions to these and other problems, and offer other advantages over the prior art.

SUMMARY OF THE INVENTION

In one embodiment, a disc drive has a disc with a storage layer, and a disc head slider moveable relative to the disc. The disc head slider comprises a slider body having a trailing edge surface and an air-bearing surface and a read head formed on the trailing edge surface. The read head comprises first and second electrical contact layers adapted to carry a sensor current, a read sensor and a bias magnet. The read sensor has first and second major side surfaces contacting the first and second electrical contact layers. The read sensor also has a top sensor edge, and has a bottom sensor edge aligned with the air-bearing surface to access data stored on the disc and has side edges. A bias magnet has a magnetic pole spaced apart from one of the plurality of edges by a spacing, and magnetically biases the read sensor. The first and second electrical contact layers are made of a material that does not magnetically shield the read sensor. Additionally, the disc drive can include shield layers disposed between the first contact layer and the substrate and on the second contact layer. Further, the biasing magnet can be an electromagnet comprising a conductor wrapped around a soft magnetic material.

Another embodiment includes a method of manufacturing a disc drive. The method includes forming a disc having a data storage layer, and forming a disc head slider. The disc head slider has a slider body with a trailing edge surface, has an air bearing surface, and is moveable relative to the data storage layer. The method further includes forming a read head on the trailing edge surface by depositing a first electrical contact layer over the trailing edge surface, and building a read sensor having first and second major side surfaces and a bottom sensor surface on the first electrical contact layer. The read sensor is in direct contact with the first electrical layer. The method also includes building a bias magnet at a spacing above a top edge of the read sensor, electrically isolating the bias magnet from the first electrical contact layer, and depositing a non-electrically conductive non-magnetic material in the spacing and remaining portion of a layer defined by the bias magnet and the read sensor. Further, the method includes depositing a second electrical contact layer on the layer defined by the bias magnet and the read sensor, electrically isolating the second electrical contact layer from the bias magnet, and is in direct contact with the read sensor. Additionally, the method can include depositing shield layers before the first electrical contact layer and on the second electrical contact layer.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
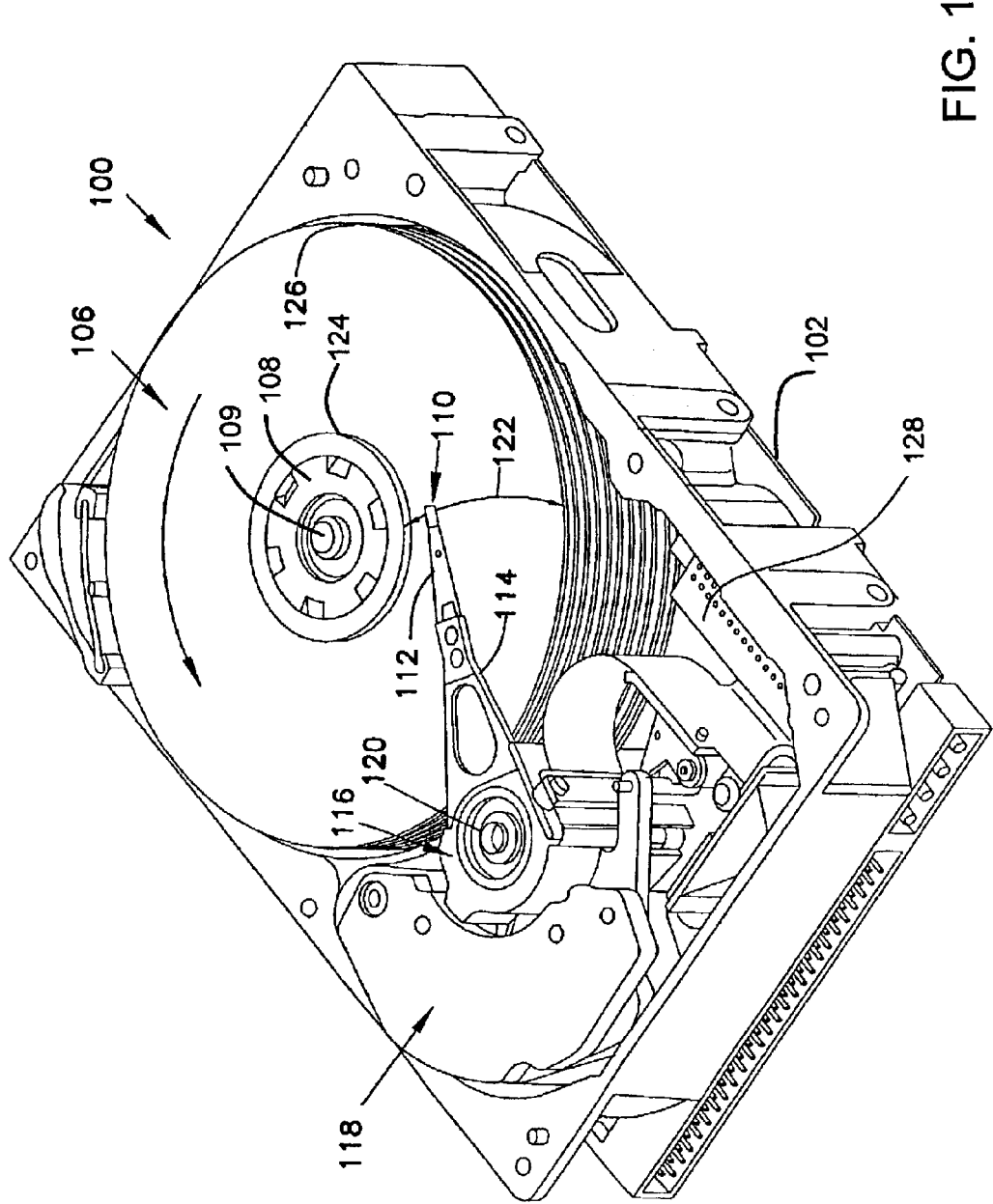
FIG. 1 illustrates an oblique view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 128 based on signals generated by heads 110 and a host computer (not shown). The arrangement of head 110 is explained in more detail below in connection with examples illustrated in FIGS. 2–14.

Figure 2:
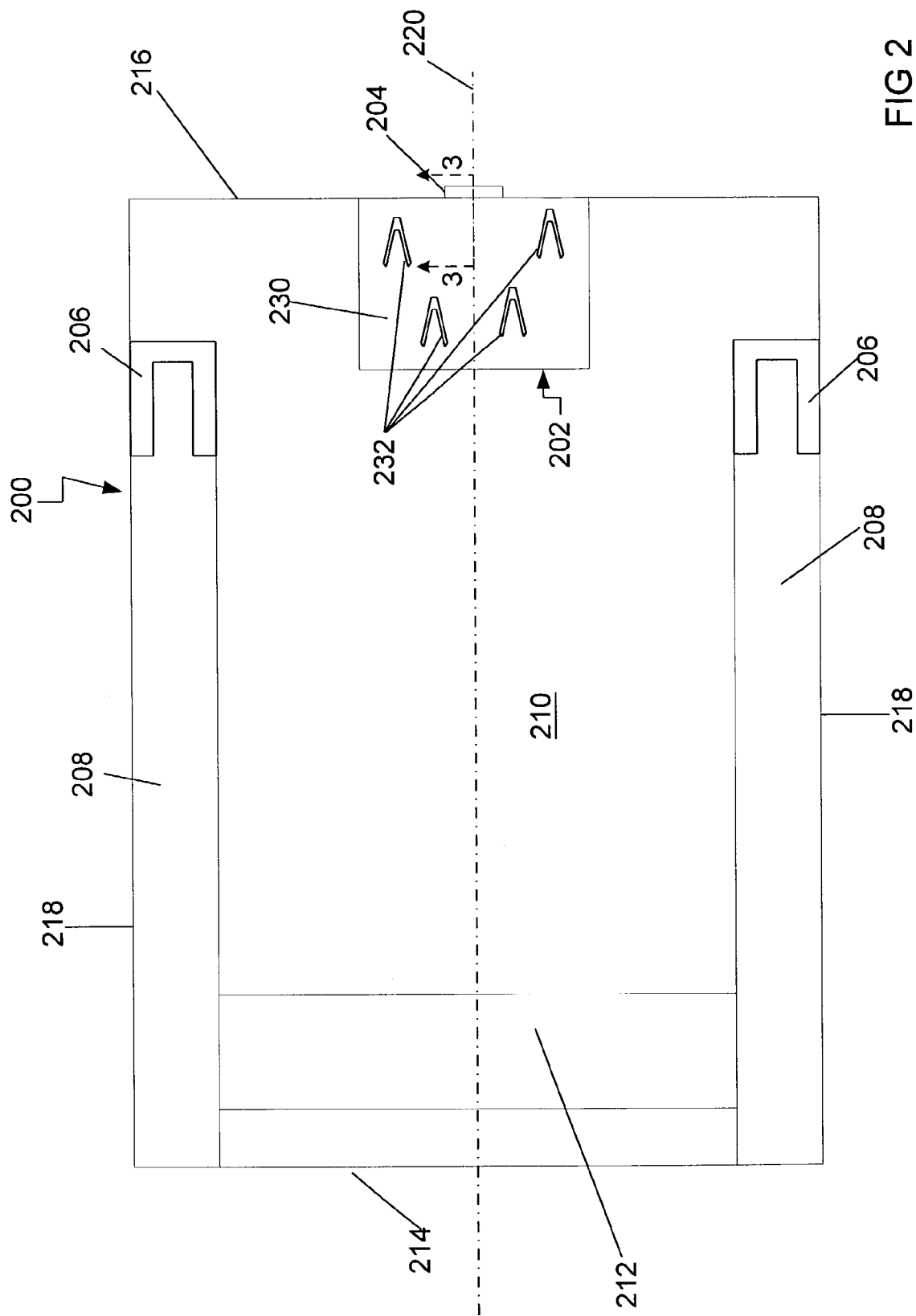
FIG. 2 illustrates a bottom plan view of a slider.

Referring now to FIG. 2, a bottom view of one example of a slider 200 is shown, which can be used on head 110 as shown in FIG. 1. In the example in FIG. 2 slider 200 has a slider leading edge 214, a slider trailing edge 216, slider side rails 208, a cavity dam 212, a sub-ambient pressurization cavity (or recessed area) 210 and a raised center pad 202. Side rails 208 extend generally from slider leading edge 214 toward slider trailing edge 216 along slider side edges 218. Side rails 208 are recessed from cavity dam 212 by a step depth, and are raised from subambient pressurization cavity 210. Pressurization features 206 are placed at the trailing edge of each slider side rail 208.

The raised center pad 202 is positioned along slider trailing edge 216, and is centered along a lateral centerline 220. Center pad 202 has a bearing surface 230 and, by way of example, a plurality of pressurization features 232 extending from the bearing surface 230. Center pad 202 supports a read/write transducer 204. However, other slider designs can be used, for example, center pad 202 can be placed off center from centerline 220 or cavity dam 212 can be removed. While the slider 200 shown in FIG. 2 is an example, one skilled in the art will appreciate that the read/write transducer 204 shown can be used with a variety of other air bearing surface (ABS) designs.

Figure 3:
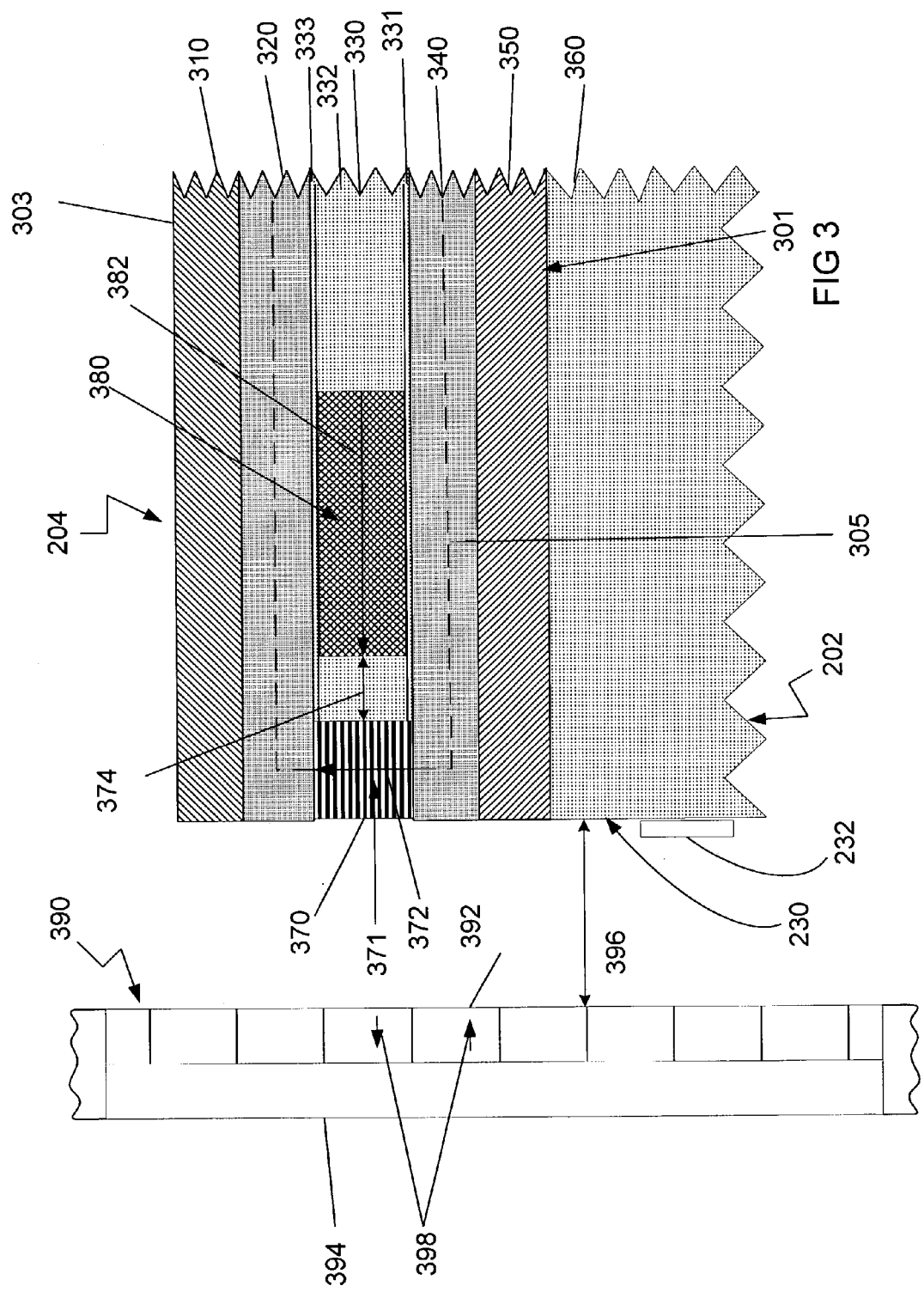
FIG. 3 illustrates a cross section of a read head sensor having a permanent magnet.

FIG. 3 shows a cross sectional view of a portion of raised center pad 202 and read/write transducer 204 cut away along line 3—3 as shown in FIG. 2. Raised center pad 202 is shown flying above media disc 390. Media disc 390 comprises recording media 392 and a soft under layer 394. Recording media 392 comprises, in one embodiment, a magnetic layer configured to record or store information in the form of magnetic transitions. Each bit is represented by the presence (1) or absence (0) of a transition in the media. Recording media 392 is also configured to record information vertically as indicated by arrows 398. Beneath recording media layer 392 is the soft under layer 394. Soft under layer 394 comprises a magnetically soft material such as CoFe, CoFeB, NiFe or a soft magnetic alloy consisting of at least one of the elements Co, Fe or Ni.

Slider 200 is configured to fly above storage media 390 at a fly height 396. In one embodiment the fly height 396 can be up to approximately 20 nm. However other design fly heights can be used.

Center pad 202 has a trailing edge 301 and an air bearing surface 230 as shown in FIG. 2, which flies over media surface 390. Read sensor 204 is formed from several layers deposited upon center pad 202 of the slider 200, and will be described in order from the center pad 202 to trailing edge 303. It will be understood by those skilled in the art that other layers can also be present. Optional shield layer 350 can be deposited upon the slider substrate material 360.

First contact layer 340 is patterned on top of optional shield layer 350, when shield layer 350 is present. However, when shield layer 350 is not present first contact layer 340 is patterned on slider substrate material 360. Layer 340 can have a thickness of 0.1 μm to 1.0 μm. However, other thicknesses can be used.

A nonmagnetic non-electrically conductive layer 330 is deposited on a portion of first contact layer 340. Layer 330 can have a thickness of 0.1 μm to 1.0 μm. However, other thicknesses can be used. A read sensor 370 having multiple layers is deposited on first contact layer 340 and next to insulating layer 330.

Insulating layer 330 is further comprised of three separate insulating layers, 331, 332, 333, that are deposited in separate steps. Layer 331 is deposited on first contact layer 340. Then layer 332 is deposited on layer 331. Finally, insulating layer 333 is deposited on top of layer 332. It should be noted that none of the layers 331, 332 333, that form insulating layer 330 cover sensor 370. Insulating layer 330 can have a thickness of 100 Angstroms (Å) to 1000 Å. However, other thickness can be used.

A cavity is etched into insulating layer 332 behind sensor 370. The cavity location defines a gap distance 374 where a biasing element 380 is formed in the cavity. In one embodiment this gap distance 374 is approximately 1–10 nm. However, other distances can be used. On top of the non-magnetic and non-electrically conductive layer 330 and sensor 370 is deposited a second contact layer 320. Following the depositing of second contact layer 320, an optional shield layer 310 can be deposited.

When using a current perpendicular to plane sensor, a sense current 305 passes through the lead/shields 310, 320, 340, 350 before entering the sensor and after leaving the sensor 370. The change in resistance of the sensor as it passes over transitions in the magnetic media 390, is used as read back signal. A change in resistance due to the leads 320, 340 changing resistance can be mistaken for the sensor 370 changing resistance, in other words may be mistaken as a portion of a read signal. [Prior art CPP sensors used leads made from Ni80Fe20 which has a fairly high anisotropic magnetoresistance (AMR) effect.] A resistance change from the lead/shields is seen as noise in the read back voltage. The resistance change can come from a transition moving past the region of the shield close to the sensor or from domain movement in the shield. Using leads made from non-magnetic material avoids this problem.

Read sensor 370 is formed adjacent to non-magnetic non-electrically conductive layer 330 between the first and second contact layers 320 and 340. In one embodiment read sensor 370 is a giant magnetoresistive (GMR) sensor and comprises multiple layers. However, read sensor 370 can be a magnetoresistive head (MR) sensor, a tunneling magnetoresistive (TMR) sensor, an anisotropic magnetoresistive (AMR) sensor or a colossal magnetoresistive (CMR) sensor. In the past the MR sensors were arranged such that the sense current passing through the MR sensor flowed parallel to the layers in the sensors. However, it is found that by selecting the flow of the current to be a perpendicular flow relative to the layers of the MR sensor larger sense currents can be used, and larger read back pulse amplitudes are achieved. The flow of current 305 through sensor 370 is indicated by arrow 372.

Next to sensor 370 the layer 330 of non-magnetic and non-electrically conductive material is deposited. In one embodiment, non-magnetic non-electrically conductive layer 330 is aluminum oxide ($Al_2O_3$). However, other non-magnetic non-electrically conductive materials can be used such as silicon dioxide ($SiO_x$), silicon nitride (SiNx) or silicon oxy-nitride (SiNxOy). Also in this layer 330 is disposed a biasing magnet 380 which is provided between contact leads 320 and 340. Biasing magnet 380 is not in contact with leads 320 and 340. Biasing magnet 380 further provides a biasing magnetic flux field in the direction indicated as an arrow 382. This biasing magnet flux magnetically biases the GMR multilayer sensor 370. The ratio of the MrT (magnetic remmenance and film thickness) of the biasing magnet to the MrT of the free layer is referred to as the stabilizing factor. Generally this stabilization factor has ranged from 1.5 to less than 5. This results in a trade off between stability and sensitivity for sensor 370. While biasing magnet 380 is shown behind sensor 370 in FIG. 3, it can be appreciated by those skilled in the art that biasing magnet 380 may be located in other areas of layer 330, such as along side sensor 370 at location 371.

When sensor 370 is a GMR sensor, adjacent ferromagnetic layers are biased by biasing magnet 380 to achieve a preferred 90 degree angle of magnetization between the ferromagnetic layers. Biasing magnet 380 can be a permanent magnet as shown in FIG. 3. However, the biasing magnet can be an electromagnet as shown as element 480 in FIG. 4.

A CPP spin-valve or TMR sensor could also be used. In this case one of the ferromagnetic layers would be pinned perpendicular to the ABS surface and ferromagnetic layer would be free to rotate and sense fields from the media. The free ferromagnetic layer would be biased/stabilized by permanent magnets located on the sides of the sensor.

Figure 4:
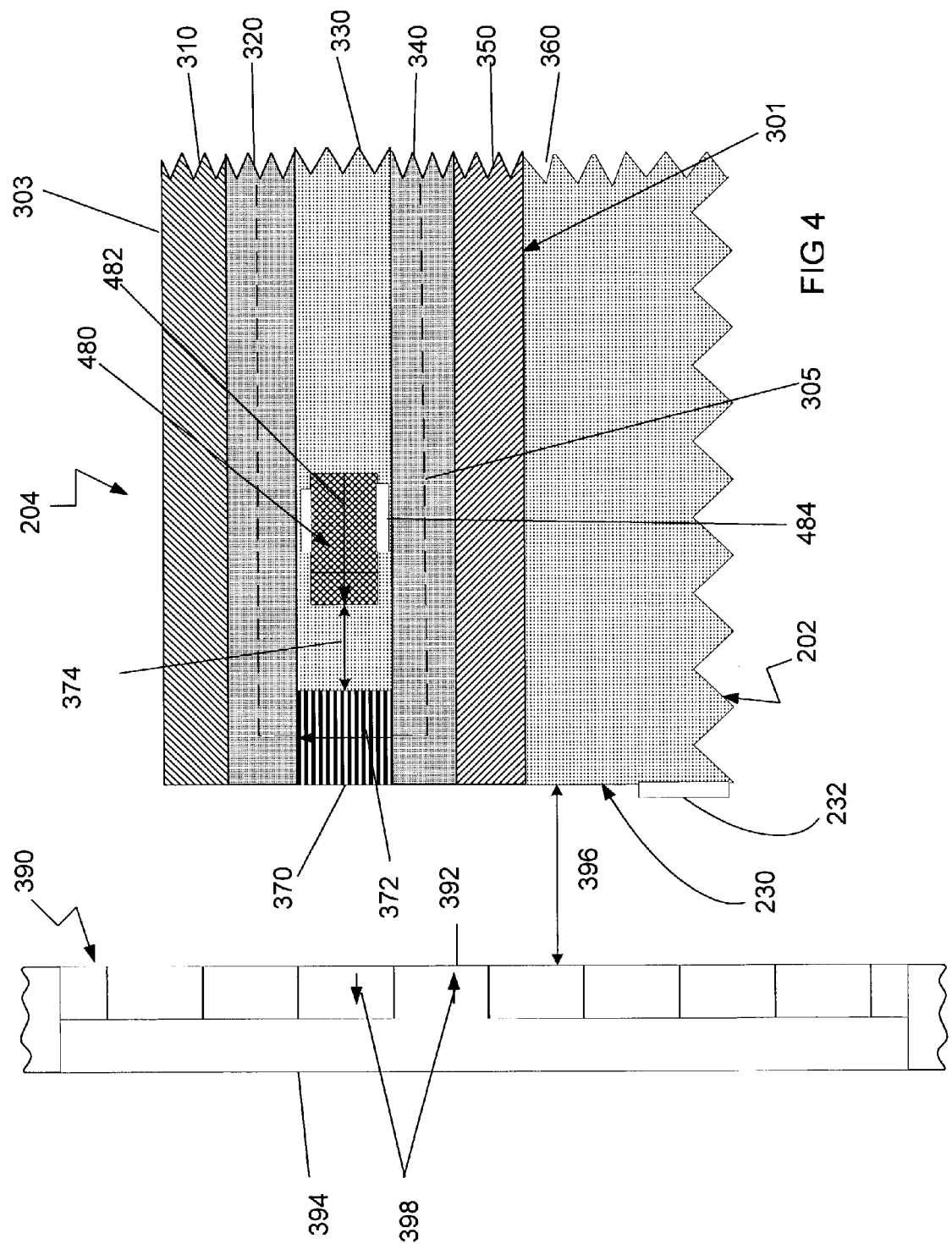
FIG. 4 illustrates a cross section of a read head sensor having an electromagnet biasing element.

FIG. 4 shows a cross sectional view of a portion of raised center pad 202 and read/write transducer 205 cut away along line 3—3 as shown in FIG. 2. Transducer 205 in FIG. 4 is similar to transducer 204 in FIG. 3, and reference numbers used in FIG. 4 that are the same as reference numbers used in FIG. 3 identify the same or similar features.

In FIG. 4, electromagnet 480 is formed in the non-magnetic non-electrically conductive layer 330 and is spaced away from sensor 370 by gap distance 374 which is filled in with the non-magnetic electrically non-conductive material used in layer 330. In one embodiment this gap distance is approximately 1–10 nm. The current to the electromagnet 480 is varied to vary the biasing flux. Electromagnet 480 provides a variable biasing flux to sensor 370 as indicated by arrow 482. Electromagnet coil 484 partially surrounds electromagnet 480, and provides an electrical current that causes electromagnet 480 to provide a biasing magnetic flux to sensor 370. Electromagnet 480 can have a variety of shapes which will be discussed later. If electromagnet 480 is used instead of permanent magnet 380, the optimum biasing point can be chosen during operation of the system. Further, the biasing point can be reoptimized as needed during the operation to account for any magnetic drifting of the system over time. In all other respects read/write transducer 205 in FIG. 4 is similar to read/write transducer 204 in FIG. 3.

First contact layer 340 and second contact layer 320 are in direct contact with and disposed on either side of layer 330. Further contact layers 320 and 340 are in direct contact with sensor 370. In spin-valve heads, the maximum sensor operating temperature is limited by the decrease in pinning verses temperature. This ultimately results in the pinning reaching zero at the blocking temperature of the antiferromagnetic material. In GMR multilayer heads, the maximum sensor operating temperature can be determined by a balance in the increase in voltage output from the increased current and the decrease in voltage output by the decreasing GMR with increasing temperature. The switch from CIP sensors to CPP sensors has allowed for larger current densities to be used which is one of the factors in increasing the output voltage. The output voltage is increased according to the following equation:

$$\Delta V = I \cdot \Delta R \cdot \epsilon \qquad \text{Equation 1}$$

where V is the output voltage, I is the sense current, ΔR is the change in the sensor resistance and ε is the efficiency factor. Increasing the ΔV by increasing I results in an increase in temperature, if the heat conduction capability of the leads is not correspondingly improved.

In the embodiment shown in both FIG. 3 and FIG. 4, first contact layer 340 and second contact layer 320 are formed of copper (Cu) or copper alloys. However, other conductive materials can be used, such as Ag, Al, Au, Rh, Cr, Tc, Ru or alloys of these materials. These conductive materials have a resistivity of approximately 2 μΩ-cm, which is low to relative to Ni80Fe20. Further these materials have a significantly higher thermal conductivity than does Ni80Fe20, and use of these conductive materials improves the operating efficiency of sensor 370 by limiting the heat/temperature build-up in sensor 370. For example, when copper is used for leads 320 and 340 the thermal conductivity of the leads increases by a factor of approximately 100, compared to prior art magnetic leads.

Further, copper has no AMR effects, so there is little to no noise from AMR effects in the leads. Copper also has a relative permeability of one, therefore no flux from the biasing magnet is lost to the shields/leads. Copper also provides benefits in limiting the spatial extent of neighborhood induced transition shift (NITS) effect. When copper is used, the NITS effect is reduced and, may be limited only to the nearest neighbors.

Optional magnetic shield layers 310 and 350 are provided next to contact layers 320 and 340. However, in contrast with prior art heads, shields 310 and 350 are not in direct contact with read sensor 370.

Optional magnetic shield layers 310 and 350 are provided to shield the read sensor 370 from magnetic fields generated by motors or other pieces of equipment external to head 204. Shield layers 310 and 350 are formed of deposited alloys of iron (Fe), nickel (Ni) or cobalt (Co) such as CoFe, CoNiFe, NiFeCu. Preferably, the shield material will be Ni80Fe20. However, other metallic magnetic materials can also be used.

Figure 5:
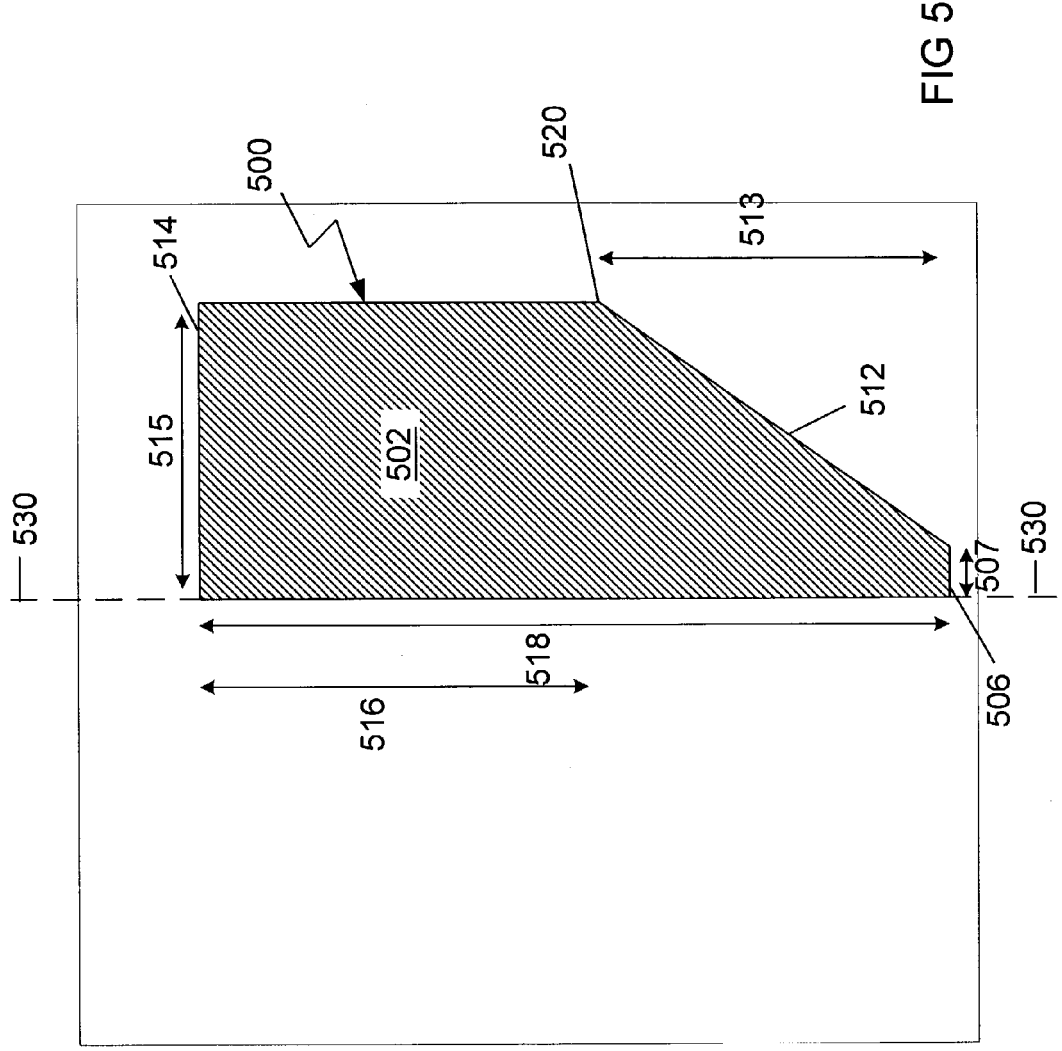
FIG. 5 illustrates a cross sectional plan view of a portion of an electromagnet core having a single taper.
Figure 6:
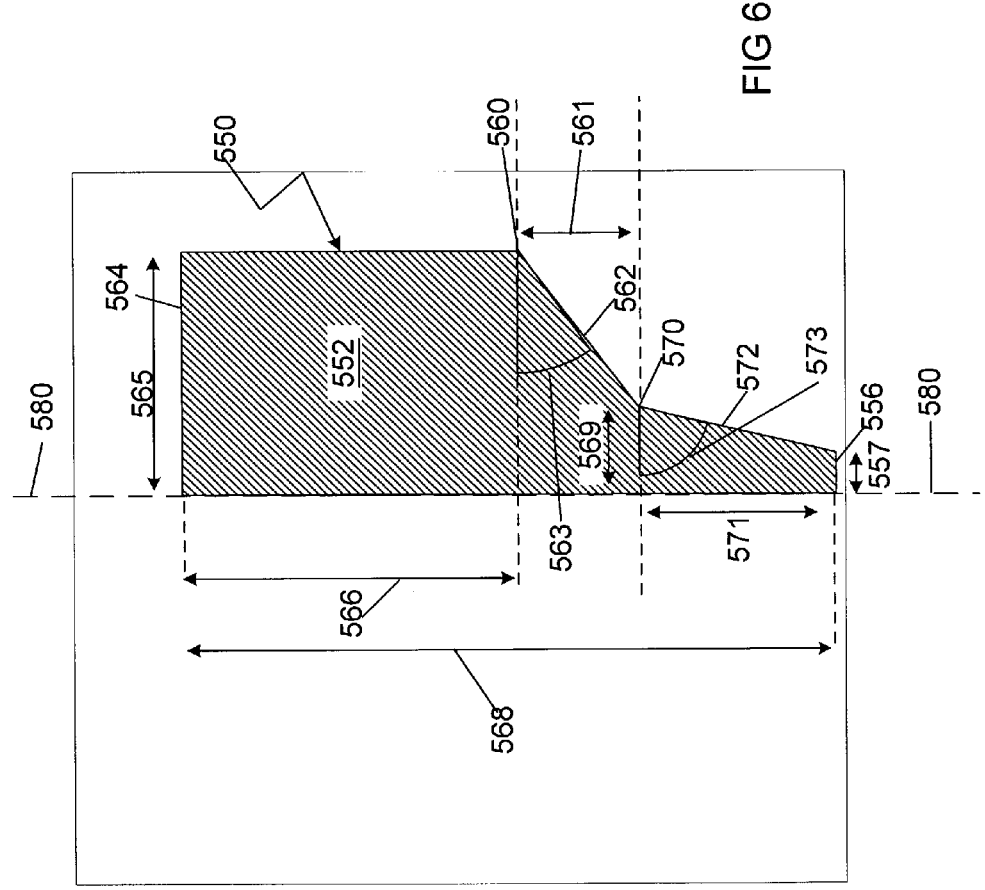
FIG. 6 illustrates a cross sectional plan view of a portion of an electromagnet having dual tapers.

Referring now to FIGS. 5 and 6, two different embodiments for an electromagnet 480 (FIG. 4), used in a shieldless current perpendicular to plane sensor according to the teachings of the present invention are shown. FIGS. 5 and 6 each show a partial view of an electromagnet core 502 and 552 having a generally polygonal form, that is to the right of centerline 530, 580. The electromagnet core 502, 552 are symmetrical about centerline 530, 580. Referring now to FIG. 5 and electromagnet 500, electromagnet 500 has a front pole 506, a back pole 514, a core length 516, an overall length 518, and a taper 512. In the embodiment shown in FIG. 5, the front pole 506 has a width 507 of 1 micron, the back pole 514 has a width 515 of 6 microns. Electromagnet 500 has a core length 516 of 4 microns, and an overall length 518 of 7.5 microns. Taper 512 narrows the electromagnet core 502 from the back pole width 515 to the pole width 507. Taper 512 begins at base 520 of electromagnet core 502 and tapers for a taper length 513. Taper length 513 has a length of 3.5 microns. However, other dimensions can be used depending on the needs of the application.

Referring now to FIG. 6 and electromagnet 550, electromagnet 550 has a pole 556, a back pole 564, a core length 566, an overall length 568, a first taper 562, and a second taper 572. In the embodiment shown in FIG. 6, the pole 556 has a width 557 of 1 micron, the back pole 564 has a width 565 of 6 microns. Electromagnet 550 has a core length 566 of 4 microns and an overall length 568 of 7.5 microns. First taper 562 narrows the electromagnetic core 552 from the back pole width 565 to a first taper width 569, over a first taper length 561 of 1.5 microns. A second taper 572 further narrows electromagnet core 552 from the first taper width 569 to the pole width 557, over a second taper length 571 of 2 microns. Taper 562 begins at base 560 of electromagnetic core 552 and ends at a second base 570 and tapers for a taper length 561. Second taper 572 begins at a second base 570 and tapers for the second taper length 571. It should be noted that the angle 563 of the first taper 562 is smaller than the angle 573 of second taper 572.

Figure 7:
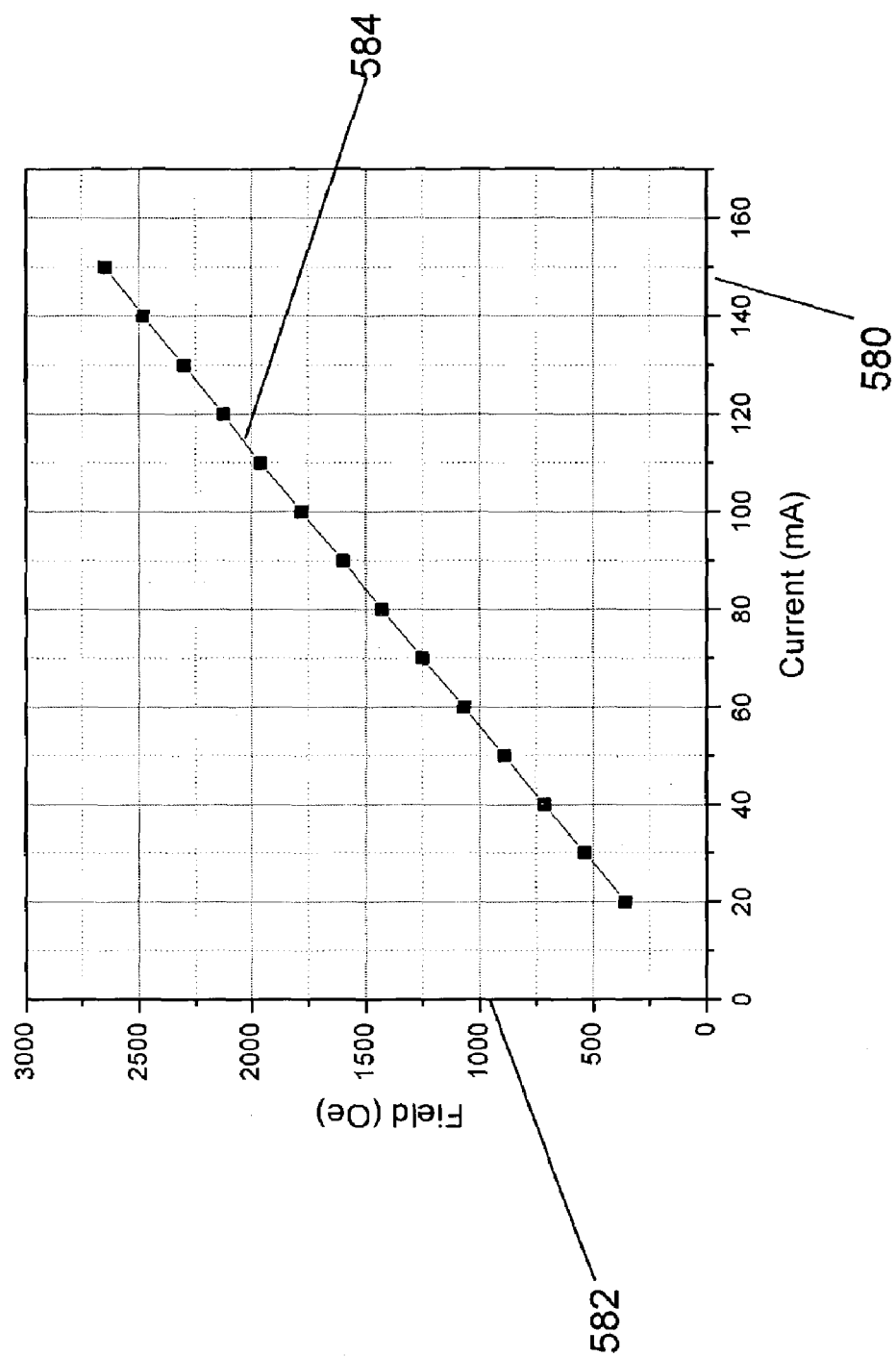
FIG. 7 illustrates a graph showing the relationship between the field and applied current.

FIG. 7 shows the effects of the electromagnetic design when used in a current perpendicular to plane head. In FIG. 7 the horizontal axis 580 represents the current flowing through the coil and has a range of 0 to 160 milliamps. The vertical axis 582 represents the magnetic field in Oersteds (Oe) applied to sensor 370, and has a range of 0 to 3,000 Oe. Line 584 shows that the field applied to the sensor is linearly proportional to the current flowing through the coil. Further, it should be noted that electromagnet 480 is not saturated within these ranges.

TABLE 1

| EM Material | Current (mA) | EM Design | Field (Oe) 35 nm from EM |
|---|---|---|---|
| Bs = 1.8 T $\mu_r$ = 500 | 100 | 1 | 1780 |
| Bs = 1.0 T $\mu_r$ = 2000 | 100 | 1 | 2007 |
| Bs = 1.0 T $\mu_r$ = 2000 | 100 | 2 | 2223 |
| Bs = 1.0 T $\mu_r$ = 50 | 50 | 2 | 299 |
| Bs = 1.0 T $\mu_r$ = 100 | 50 | 2 | 522 |
| Bs = 1.0 T $\mu_r$ = 100 Coil 1.5 μm back | 50 | 3 | 1134 |

Table 1 shows a table with a calculated field for the two embodiments of the electromagnet shown in FIGS. 5 and 6, and assumes a coil to pole separation of 3.5 microns. The first column of table 1 lists the properties of the electromagnetic (EM) material used to form electromagnet 500 and 550. The second column of table 1 lists the current in milliamps flowing through the coils for each electromagnetic design and EM material. The third column lists the electromagnet design used in either FIG. 5 (EM Design 1) or FIG. 6 (EM Design 2). However, the last EM (EM Design 3) design entry is for an electromagnet similar to the one shown in FIG. 6 except that the coil to pole separation is reduced to 1.5 microns. The fourth column lists the biasing field measured at a distance of 35 nanometers from either pole 506 or pole 556 in Oe.

Table 1 shows that an increase in the biasing field can be achieved by further tapering the electromagnet down near the sensor as shown by the difference between the electromagnets of FIGS. 5 and 6. Table 1 is based on a gap spacing 374 of 10 nm between pole 506 or 556 and sensor 370. Table 1 is also based on a stripe height of sensor 370 of approximately 50 nm, which places the center of sensor 370 at approximately 35 nm from pole 506 or 556 depending on the design. The field necessary to bias the CPP-multilayer sensor is in the range of 500 to 1,000 Oe, which is adequately provided for by the electromagnet designs of FIGS. 5 and 6 when a current of 100 milliamps is used.

Figure 8:
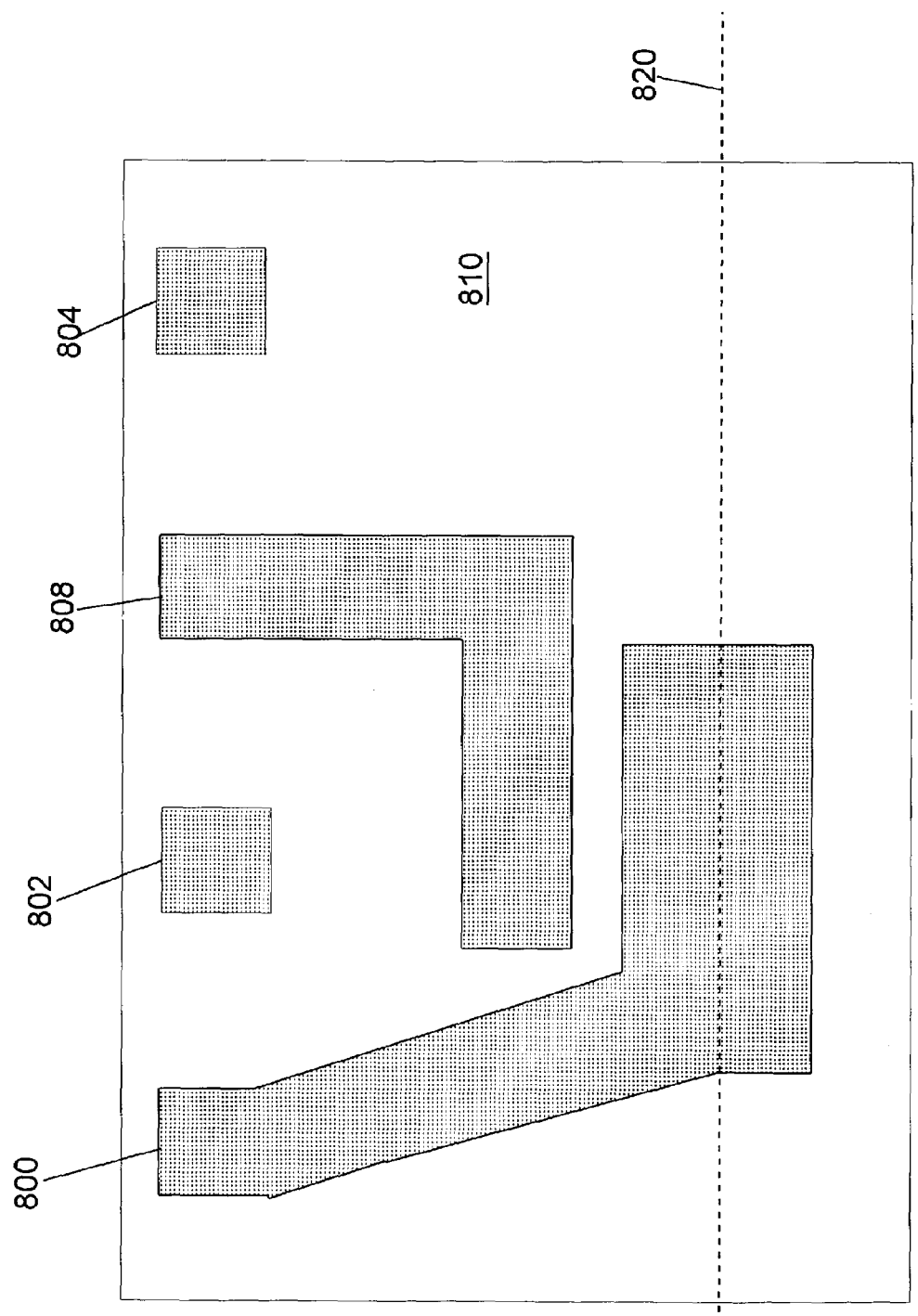
FIGS. 8–14 show the processing steps for making a read head sensor in accordance with one embodiment of the present invention.

FIGS. 8–14 show the process of building a shieldless CPP read head. FIG. 8 shows a bottom contact 800 and a bottom coil 808 formed on a wafer 810. Those skilled in the art will realize that following the processing of the wafer, sliders will be cut from the wafer. The future air-bearing surface 304 (FIGS. 3–4) is indicated by dashed line 820. Bottom contact 800 and bottom coil 808 are formed by sputter depositing the bottom contact material on the wafer 810. Following the sputtering, optical lithography is used to pattern the bottom lead and bottom coil. Then ion beam etching (IBE) is used to form bottom lead 800, bottom coil 808 and the contact pads for the top coil 804 and top lead 802. Alumina is then deposited to fill-in the remainder of the layer that was removed by the IBE. Then the photoresist and alumina that are on top of the bottom contact 804 and bottom coil 808 are lifted off using an IBE lift off process followed by a chemical mechanical polishing (CMP) process.

Figure 9:
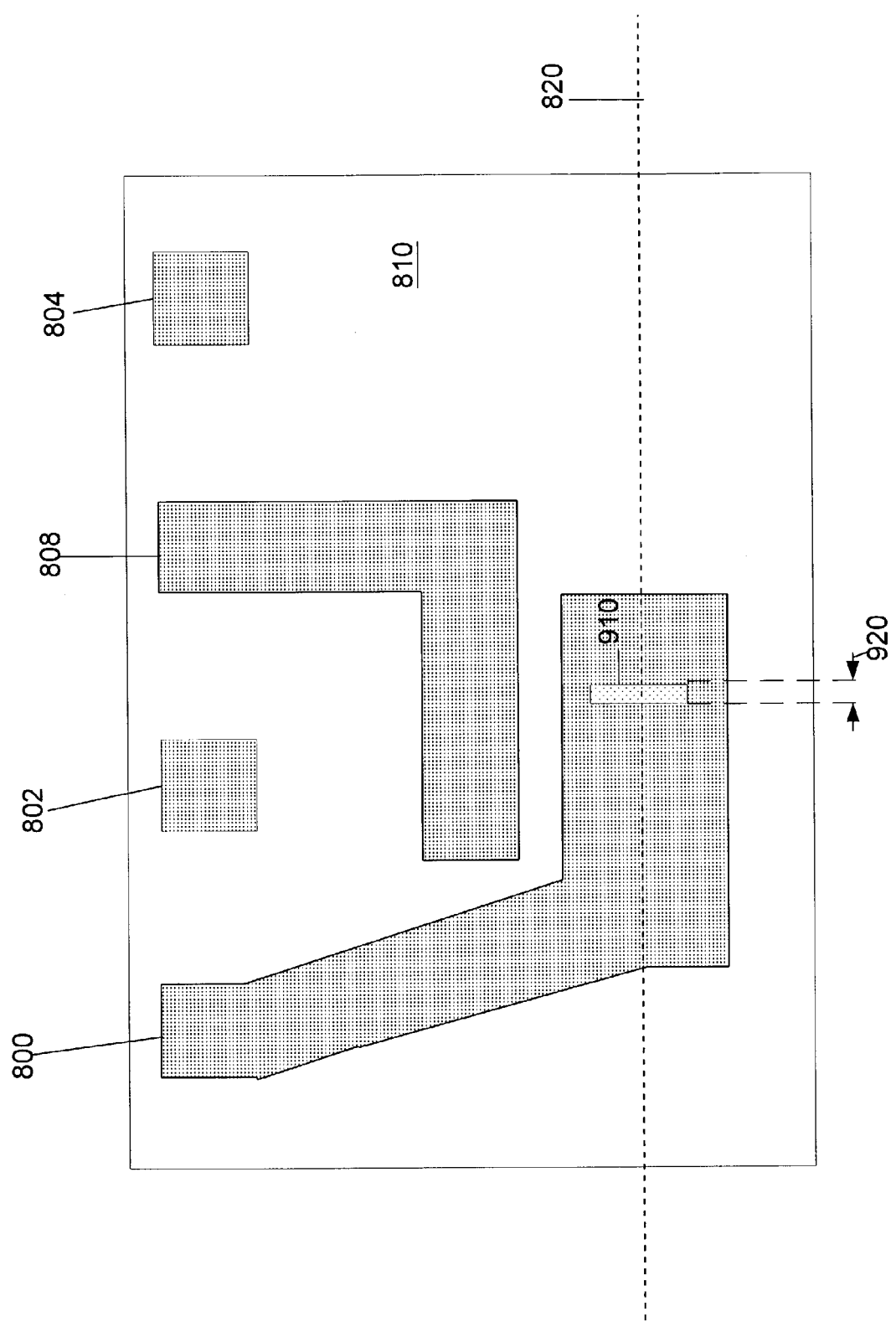

FIG. 9 shows the formation of the sensor 910 on bottom contact 800. First, electron beam lithography (Ebeam) is used to define the sensor width 920. Following the Ebeam lithography IBE is used to define the sensor width by removing excess material. Alumina is then deposited to fill-in the remaining spaces created by the IBE. IBE and CMP lift off assist are used to remove the photoresist and alumina that are on top of the bottom contact 804, bottom coil 808 and sensor 910, in preparation for the next step in manufacturing.

Figure 10:
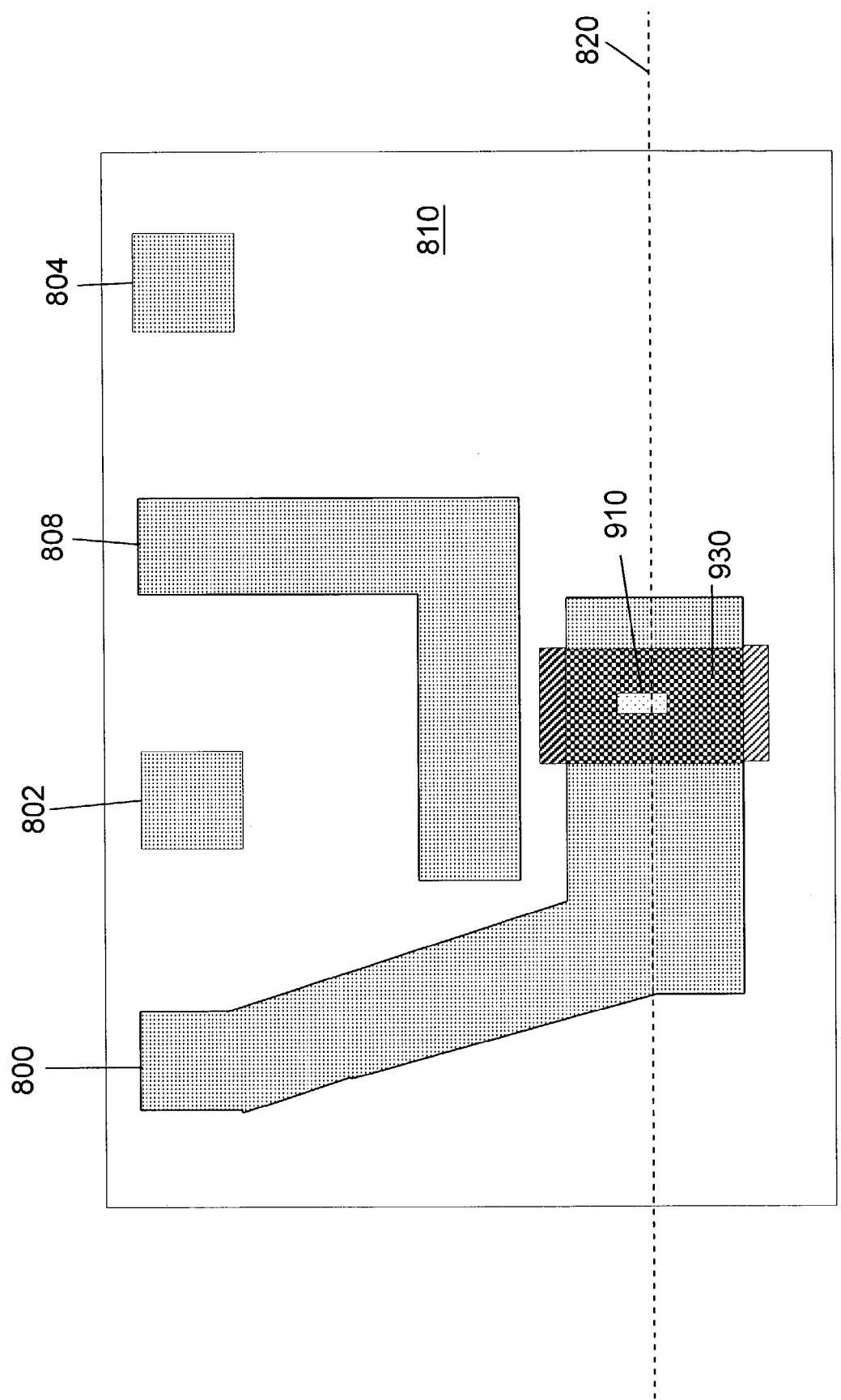

FIG. 10 shows the formation of the insulator insert 930. First, Ebeam lithography is used to define the insulator insert 930. In this case, the Ebeam resist is a dual layer resist to allow for easy lift off. Following the Ebeam lithography, ion beam deposition (IBD) is used to deposit alumina over the entire wafer 810. The alumina on top of the Ebeam resist is lifted off using standard lift off techniques, such as sonication in a solvent.

Figure 11:
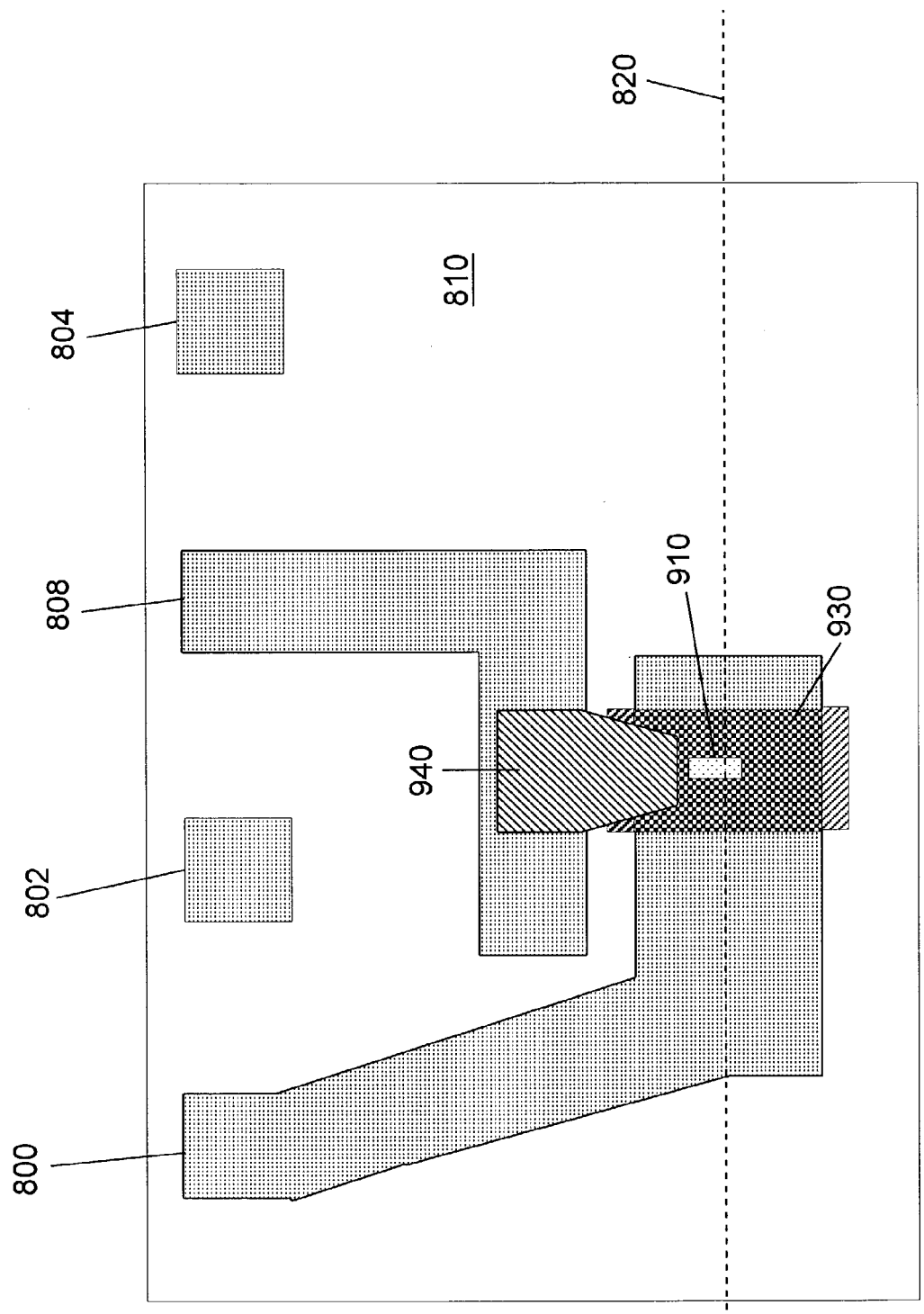

FIG. 11 shows sensor 910 with magnet 940 formed on the contact layer. First the stripe height of sensor 910 is defined using Ebeam lithography and IBE. Then an electromagnet 940 made of soft magnetic material is deposited on the bottom coil material. Either standard lift off techniques and/or IBE and CMP lift off are used to remove excess material from the wafer.

Figure 12:
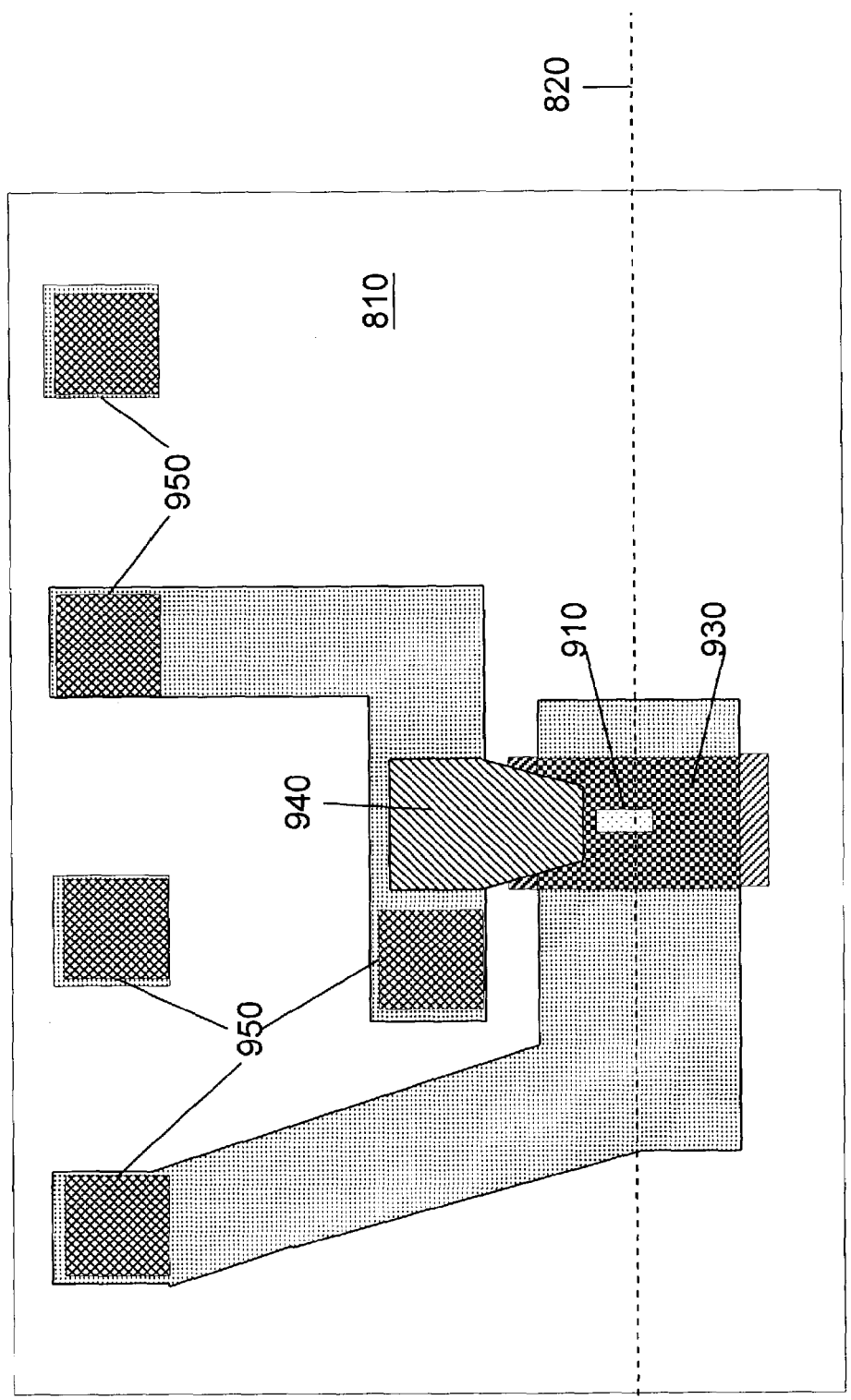

FIG. 12 shows the creation of vias 950 to the bottom lead 804 and coil 808 and bottom sensor 800. First photoresist is deposited on the wafer 810 then a via 950 is opened by using optical lithography and reactive ion beam etching (RIBE). Following the RIBE, the photoresist is removed by striping the remaining photo resist off the wafer. Vias 950 are then filled with a conductive material.

Figure 13:
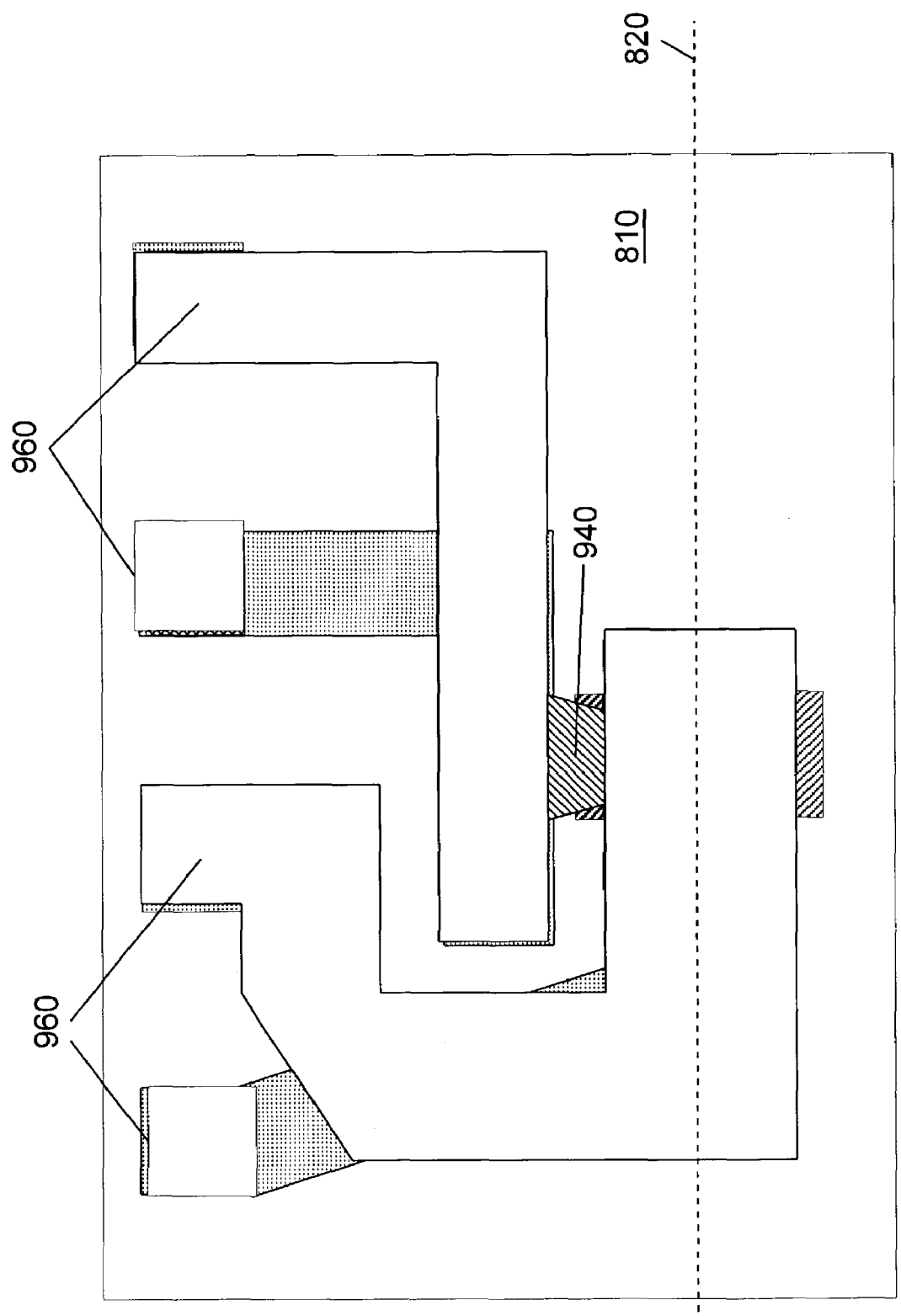

FIG. 13 shows the top lead and top coil 960. Top lead and top coil 960 are deposited on the wafer 810 following the process in FIG. 12. Photoresist is placed on the layer and optical lithography is used to form the top lead and coil 960. IBE is used to remove the material not under the resist. Then the remaining photo resist is stripped off the wafer.

Figure 14:
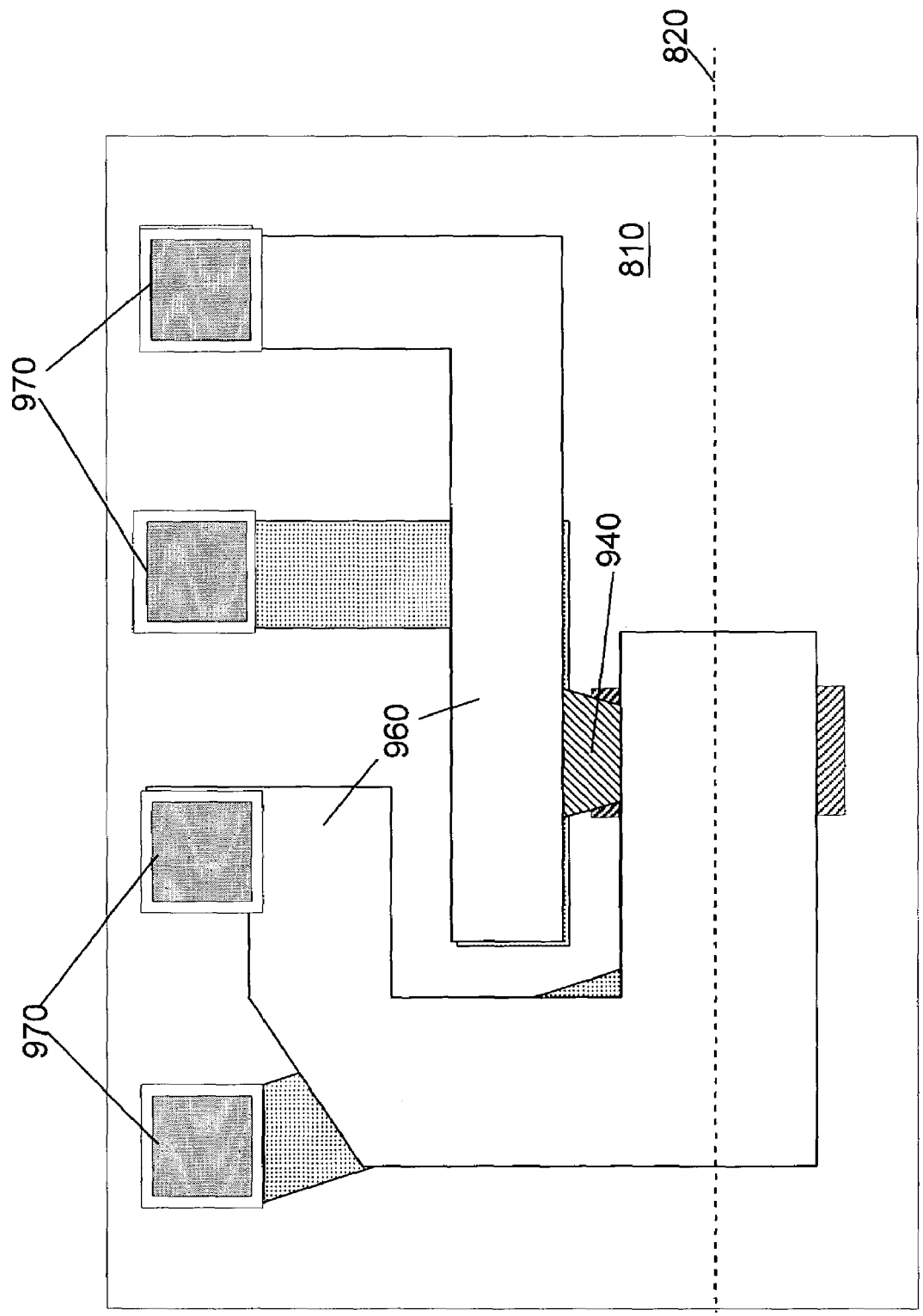

FIG. 14 shows the final read head sensor at the wafer level. Following the process of FIG. 13 standard copper pads and copper stud processing is used to provide the contacts 970 of the head sensor. The wafer is then diced up into bars, lapped to the ABS, diced into sliders and built into head gimbal assemblies (HGAs).

One embodiment of the present invention is directed to a disc head slider (110) moveable relative to a storage media having a storage layer (392) (390). The disc head slider (200) comprises a slider body (260) having a trailing edge surface (216) and an air-bearing surface (230, 304, 820) and a read head (204) formed on the trailing edge surface (216). The read head (204) comprises a first electrical contact layer (340) adapted to carry a sensor current, a second electrical contact layer (320) adapted to carry the sensor current, a read sensor (370) and a bias magnet (380, 480, 500, 550). The read sensor (370) has first and second major side surfaces contacting the first and second electrical contact layers (340, 320). The read sensor (370) also has a top sensor edge and a bottom sensor edge aligned with the air-bearing surface (230, 304, 820) to access data in the storage media (390) and side edges. A bias magnet (380, 480, 500, 550) has a magnetic pole (506, 556) spaced apart from one of the plurality of edges by a spacing (390), and magnetically biases the read sensor (370). The first and second electrical contact layers (340, 320) are formed of a material that does not magnetically shield the read sensor (370). The sensor current also flows perpendicular to the first and second side surfaces. Additionally, the disc drive can include shield layers (310, 350) disposed between the first contact layer and the substrate and on top of the second contact layer (340, 320).

Another embodiment of the present invention is directed to a method of manufacturing a read head (370) depositing a first electrical contact layer (340) over a trailing edge surface (216) of a slider body (200), building a read sensor (370) having first and second major side surfaces and a bottom sensor surface on the first electrical contact layer (340). The read sensor is in direct contact with the first electrical layer (340). Next, the method includes building a bias magnet (380, 480, 500, 550) at a spacing (374) above a top edge of the read sensor (370), the bias magnet (380, 480, 500, 550) electrically isolated from the first electrical contact layer (340), depositing a non-electrically conductive non-magnetic material (330) in the spacing (374) and remaining portion of the layer (330) defined by the bias magnet (380, 480, 500, 550) and the read sensor (370). Further, the method includes depositing a second electrical contact (320) layer on the layer (330) defined by the bias magnet (380, 480, 500, 550) and the read sensor (370), the second electrical contact layer (320) being electrically isolated from the bias magnet (380, 480, 500, 550), and in direct contact with the read sensor (370). Additionally, the method can include depositing shield layers (310, 350) before the first electrical contact layer and on the second electrical contact layer.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. In addition, although the preferred embodiment described herein is directed to a disc drive system having current perpendicular to plane read sensor using perpendicular recording, it will be appreciated by those skilled in the art that the teachings of the present invention can be applied to current in plane read sensors and/or storage devices using longitudinal recording, without departing from the scope and spirit of the present invention.

What is claimed is:

1. A head slider moveable relative to a storage media having a storage layer, the head slider comprising:
   a slider body having a trailing edge surface and an air-bearing surface;
   a read head formed on the trailing edge surface, the read head comprising:
      a first electrical contact layer adapted to carry a sensor current;
      a second electrical contact layer adapted to carry the sensor current;
      a read sensor having first and second major side surfaces contacting the first and second electrical contact layers, respectively, to carry the sensor current, the read sensor having a plurality of edges including a top sensor edge, a bottom sensor edge aligned with the airbearing surface to access data in the storage layer and side edges;
      an electromagnetic bias magnet having a magnetic pole spaced apart from one of the plurality of edges by a spacing, the bias magnet magnetically biasing the read sensor;
   wherein the first and second electrical contact layers are formed of a material that does not magnetically shield the read sensor; and
   wherein the sensor current in the read sensor flows perpendicularly to the first and second major side surfaces.

2. The head slider of claim 1 wherein the biasing magnet is disposed above the top sensor edge.

3. The head slider of claim 1 wherein the biasing magnet is disposed opposed to a side edge.

4. The head slider in claim 1 wherein the read head further comprises:
   a first outer shield layer disposed between the first electrical contact layer and the slider body; and
   a second outer shield layer disposed over the second electrical contact layer.

5. The head slider of claim 4 wherein:
   the first outer shield layer is spaced apart from the first electrical contact layer by a first insulating layer; and
   the second outer shield layer is spaced apart from the second electrical contact layer by a second insulating layer.

6. The head slider of claim 1 wherein the read sensor comprises a magnetoresistive sensor.

7. The head slider of claim 1 wherein the electromagnetic bias magnet comprises a deposit of soft magnetic material and a magnet current conductor looped around the deposit of soft magnetic material.

8. The head slider of claim 7 wherein the electromagnetic bias magnet has a generally polygonal form, including a main core joined to the magnet pole tip by a tapering portion.

9. The head slider of claim 8 wherein the tapering portion tapers incrementally into at least two increments.

10. The head slider of claim 7 further comprising:
    a current source connected to the magnet current conductor; and
    wherein the current source is adjusted as a factor of feedback from the read head to adjust the biasing of the read sensor.

11. The head slider of claim 1 wherein the first and second electrical contact layers comprise a non-magnetic electrically conductive material.

12. The head slider of claim 1 wherein the first and second contact layers are comprised of a material where in a portion of the material is selected from the group consisting of alloys of Cu, Au, Ag, Rh, Cr, Ta, Ru and Al.

13. The head slider of claim 1 wherein the spacing is in the range of 2 to 11 nm.

14. The head slider of claim 1 wherein the read sensor has a stripe height in the range of 20 to 100 nm.

15. The head slider of claim 1 wherein the read head comprises a tunnel junction.

16. A method of manufacturing a read head comprising the steps of:
    depositing a first electrical contact layer over a trailing edge surface of a slider body;
       building a read sensor having first and second major side surfaces and a bottom sensor surface on the first electrical contact layer, the read sensor being in direct contact with the first electrical layer;
       building an electromagnetic bias magnet at a spacing above a top edge of the read sensor, the bias magnet being electrically isolated from the first electrical contact layer;
    depositing a non-electrically conductive non magnetic material in the spacing and remaining portion of a layer defined by the bias magnet and the read sensor; and
    depositing a second electrical contact layer on the layer defined by the bias magnet and the read sensor, the second electrical contact layer being electrically isolated from the bias magnet, and in direct contact with the read sensor.

17. The method of claim 16 further comprising the steps of:
    prior to depositing the first electrical contact layer, depositing a first shield layer over the trailing edge surface;
    following depositing the second electrical contact layer, depositing a second shield layer over the second contact layer; and
    wherein the first contact layer is deposited on the first shield layer.

18. The method of claim 16 wherein the first and second electrical contact layers are composed of non-magnetic electrically conductive materials.

19. A storage device comprising:
    a storage means for storing data formatted for perpendicular recording, having a read head disposed on a trailing edge of a slider body, the read head having a plurality of layers and configured to fly over the storage means, the read head comprising:
       a read means for reading data stored in the storage means;
       a biasing means for biasing the read means;
       a first current carrying means for carrying a current from a current source to the read means, the first current carrying means comprising a non-magnetic electrically conductive material;
    a second current carrying means for carrying a current from the read means to the current source, the second current carrying means comprising a non-magnetic electrically conductive material; and
    wherein the current flowing in the read means flows perpendicular to the layers.

20. The storage device of claim 19 further comprising:
    a first outside shield means for shielding the read means from outside electromagnetic interference, the first outside shield means disposed between the first current carrying means and the slider body; and
    a second outside shield means for shielding the read means from outside electromagnetic interference, the second outside shield means disposed over the second current carrying means.

* * * * *